(12) United States Patent
Hoeffner

(10) Patent No.: US 7,758,184 B2
(45) Date of Patent: Jul. 20, 2010

(54) VISION OBSTRUCTING EYEWEAR

(76) Inventor: Elizabeth Ann Hoeffner, 51 Tarence St., Rockville Centre, NY (US) 11570

( * ) Notice: Subject to any disclaimer, the term of this patent is extended or adjusted under 35 U.S.C. 154(b) by 0 days.

(21) Appl. No.: 11/968,356

(22) Filed: Jan. 2, 2008

(65) Prior Publication Data
US 2009/0168011 A1    Jul. 2, 2009

(51) Int. Cl.
*G02C 7/16* (2006.01)
(52) U.S. Cl. .............................. 351/45; 351/46; 351/158
(58) Field of Classification Search ................... 351/41, 351/44–46, 158
See application file for complete search history.

(56) References Cited

U.S. PATENT DOCUMENTS

| | | | | | |
|---|---|---|---|---|---|
| 3,752,567 | A | * | 8/1973 | Broadhurst | 351/47 |
| 4,869,584 | A | * | 9/1989 | Dion | 351/45 |
| 4,953,231 | A | * | 9/1990 | Burnett | 2/13 |

* cited by examiner

*Primary Examiner*—Huy K Mai
(74) *Attorney, Agent, or Firm*—Patrick J. Hoeffner, Esq.

(57) ABSTRACT

The present invention is directed to eyewear which obstructs a user's vision to simulate game conditions when training for a sport. The level of obstruction can be random or in a controlled program.

2 Claims, 5 Drawing Sheets

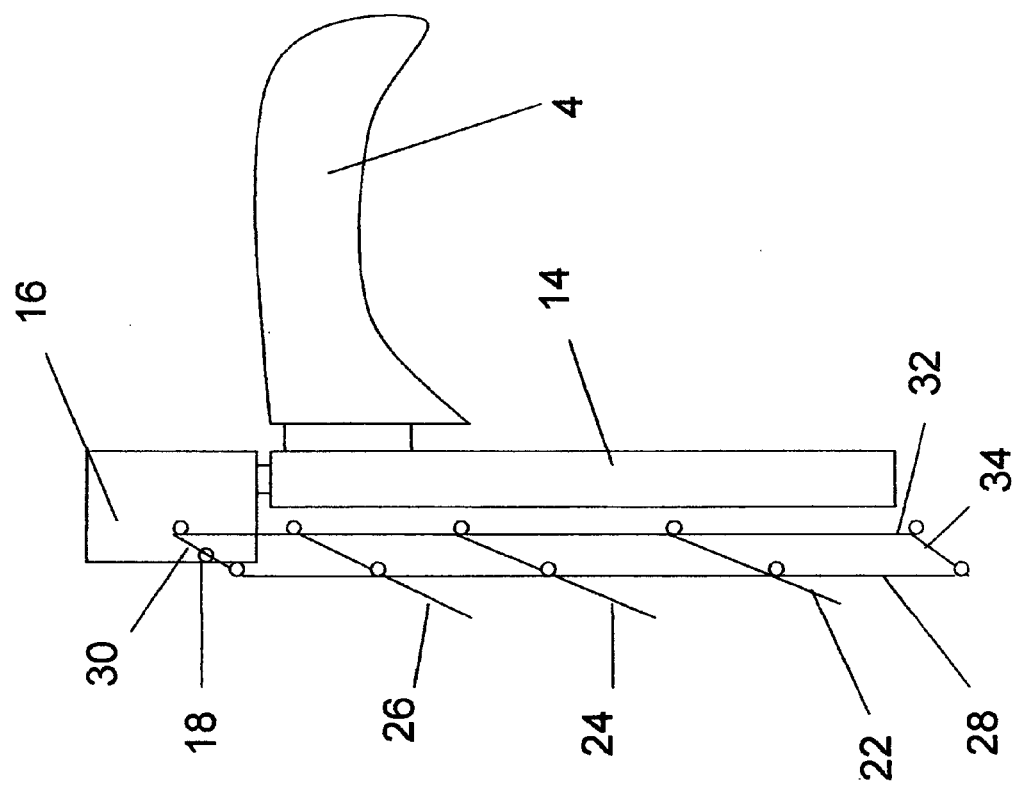
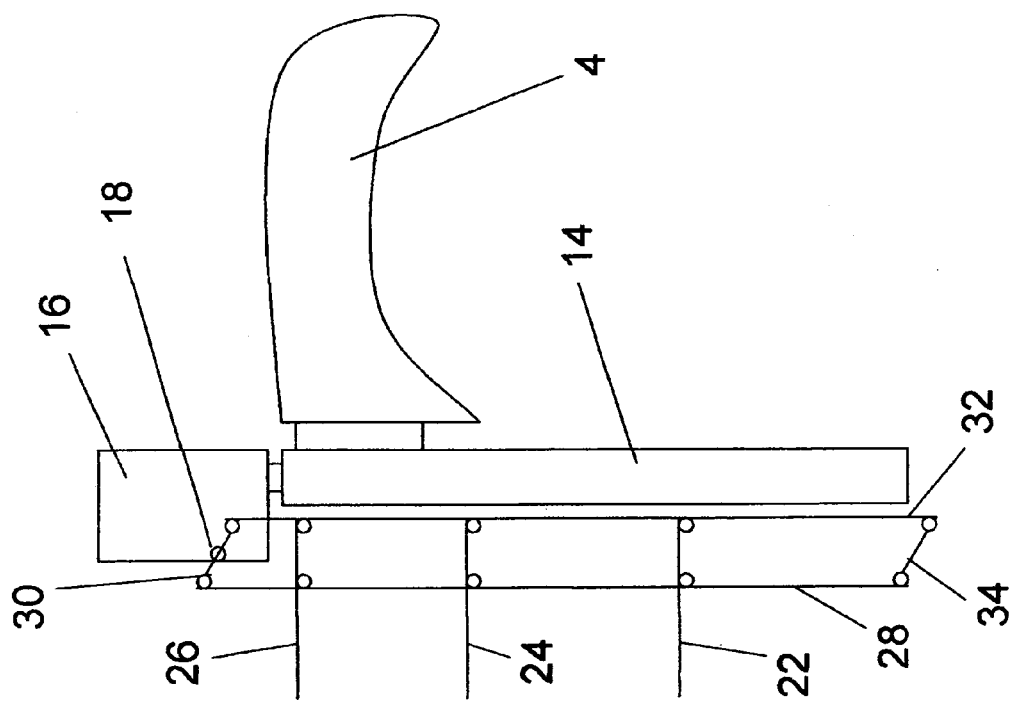

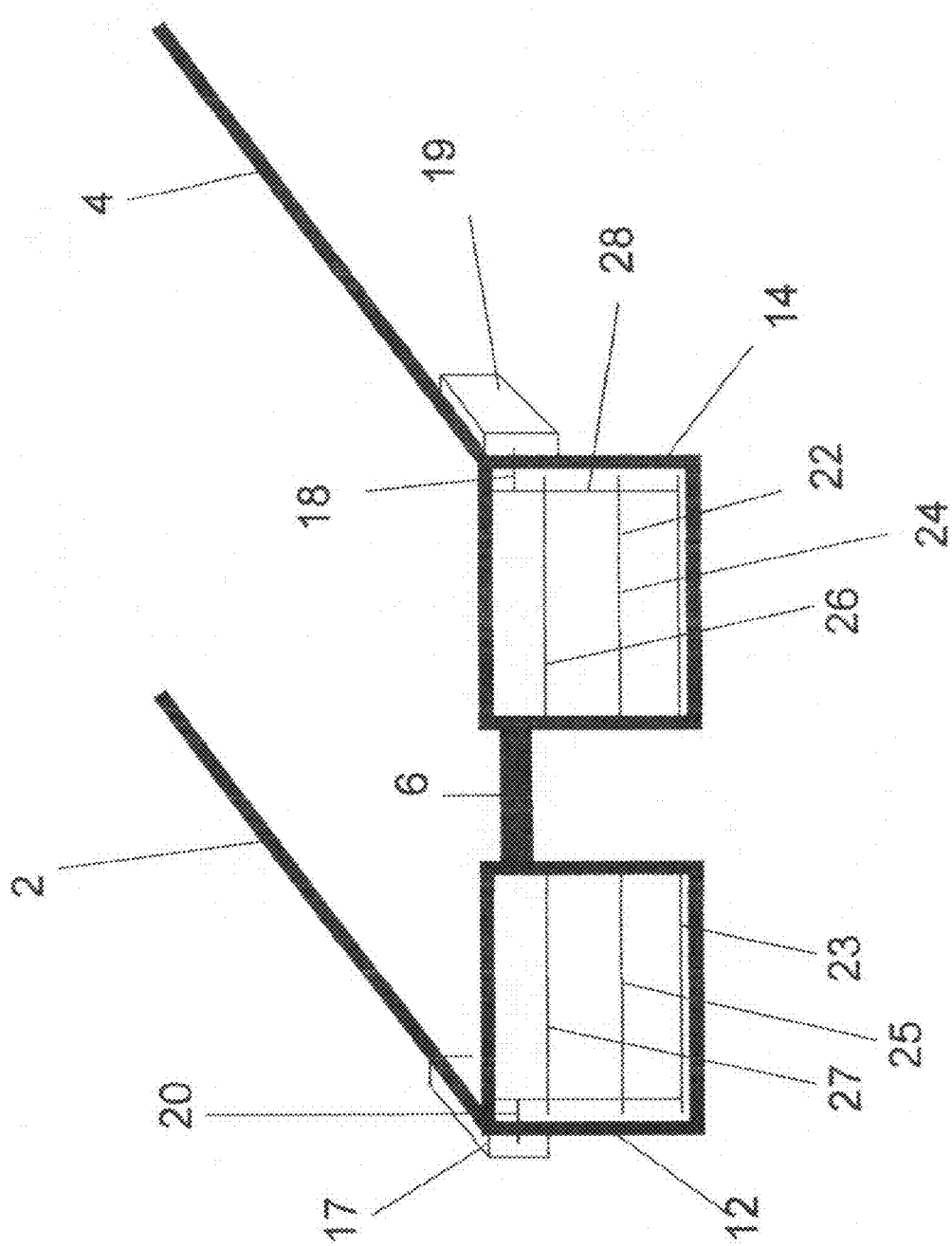

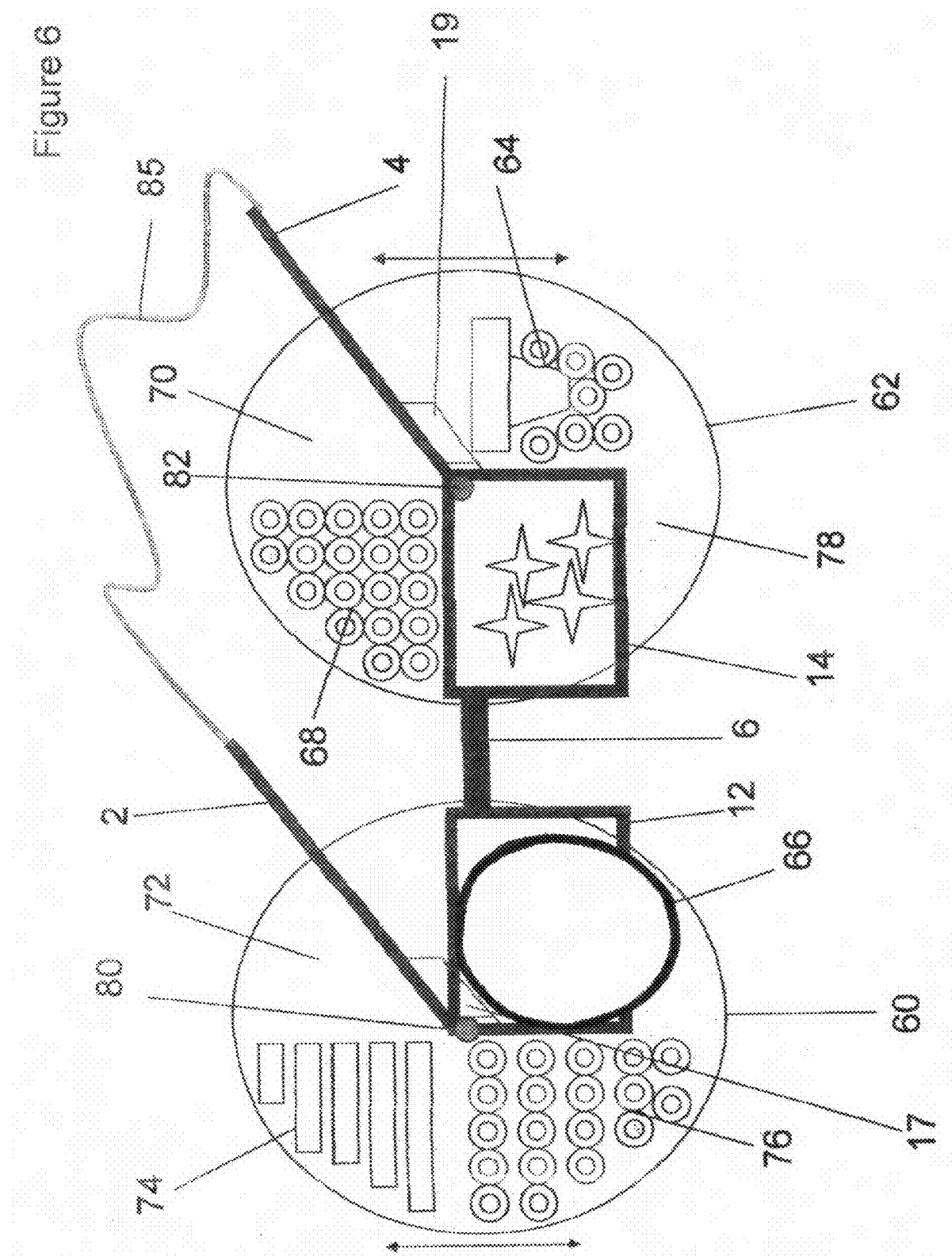

VISION OBSTRUCTING EYEWEAR

BACKGROUND OF THE INVENTION

1. Field of the Invention

The present invention relates to eyewear and more particularly pertains to vision obstructing eyewear for obstructing an individual's field of vision.

2. Description of the Prior Art

Training for certain sports can be difficult when game conditions cannot be easily duplicated. For example, practicing jump shots in basketball would require a defensive player to obstruct the shooter's view of the basket—that is, to reproduce game conditions. Another person having a similar skill level is not always available to practice with the shooter. Furthermore, by requiring one person to act as the defensive player, the amount of time that both players can spend practicing jump shots is reduced by half.

The use of vision obstructing eyewear to aid in sports training is known in the prior art. For example, alignment eyeglasses are illustrated in U.S. Pat. No. 5,177,510 which may be utilized to aid a wearer, especially athletes or participants in sports, to diminish the input from his oculo-vestibular reflexes and provide immediate visual feedback concerning alignment. The eyeglasses have one or more substantially straight, visible transparent lines on one or both of the eye pieces which appear to be superimposed on the view through the line or lines. The lines enable the wearer of the eyeglasses to readily check alignment of the body, head, hands, and/or a held object with a viewed object, e.g. a golf ball, a pitched baseball, a bowling pin, a basketball, etc.

Other known prior art devices are disclosed in U.S. Pat. Nos. 4,741,611; 4,953,967; 5,162,823; 5,076,681; 5,521,653; and U.S. Pat. No. Des. 273,684.

While these devices fulfill their respective, particular objectives and requirements, the aforementioned patents restrict vision in predictable patterns. They do not disclose vision obstructing eyewear that mechanically vary the vision obstructing medium randomly or in a programmed manner to reproduce actual game conditions and aid in training.

In these respects, the vision obstructing eyewear according to the present invention substantially departs from the conventional concepts and designs of the prior art, and in so doing provide an improved apparatus primarily developed for the purpose of variably obstructing an individual's field of vision.

SUMMARY OF THE INVENTION

A first embodiment of the vision obstructing eyewear comprises a mounting means for removably securing the eyewear to a user's head; a first lens frame connected to the mounting means; a second lens frame connected to the mounting means; a control means for selecting a type of vision obstruction; the control means proximately attached to the mounting means; and a vision obstruction means operably engaged to the control means and proximately attached to the first lens frame. Optionally, the mounting means may comprise a first earpiece having proximal and distal ends, the first earpiece being of sufficient length to span the distance from a user's eye to a user's ear, the proximal end of the first earpiece being connected to a first lens frame; a second earpiece having proximal and distal ends, the second earpiece being of sufficient length to span the distance from a user's eye to a user's ear, the proximal end of the second earpiece being connected to a second lens frame; and a nose bridge having distal and proximal ends, the distal end being connected to the first lens frame and the proximal end being connected to the second lens frame. The mounting means may further comprises an elastic band having one end attached to the distal end of the first earpiece and the other end attached to the distal end of the second earpiece. Alternatively, the mounting means may comprise an elastic band having one end attached to the first lens frame and the opposing end attached to the second lens frame.

In a further alternative embodiment, the mounting means may comprise one or more clips to removably attach the vision obstructing eyewear to prescription eyeglasses.

In an even further embodiment, the control means comprises a power source; one or more motors operatively engaged to the power source; and one or more movable posts operatively engaged to the one or more motors. In an even further alternative embodiment, the control means comprises a key (i.e., a knob operatively engaged to a spring); a spring operatively engaged to the key; and a movable post operatively engaged to the spring. Optionally, the control means further comprises a microprocessor operatively engaged to the motor and an input/output device operably engaged to the microprocessor. In some embodiments, the control means further comprises a sensor operably engaged to the input/output device where the sensor is remotely located from the vision obstructing eyewear.

In another embodiment of the vision obstructing eyewear, the vision obstruction means comprises an upper bar having a proximal end and a distal end, the upper bar being attached to the movable post at a position along the upper bar's length; a front bar having a proximal end and a distal end, the proximal end of the front bar being pivotally attached to the proximal end of the upper bar; a rear bar having a proximal end and a distal end, the proximal end of the rear bar being pivotally attached to the distal end of the upper bar; a lower bar having a proximal end and a distal end, the proximal end of the lower bar being pivotally attached to the distal end of the rear bar and the distal end of the rear bar being pivotally attached to the distal end of the front bar; and one or more shutters operatively attached at one or more first points along the front bar and one or more second points along the rear bar. The one or more shutters are pivotally engaged to the lens frame. Optionally, the control means further comprises a microprocessor operatively engaged to the motor and an input/output device operably engaged to the microprocessor. As a further option, the control means may comprise a sensor operably engaged to the input/output device wherein the sensor is remotely located from the vision obstructing eyewear.

In an alternative embodiment, the vision obstruction means comprises one or more disks operatively engaged to the one or more posts. The one or more disks may be substantially parallel to the lens frame may have at least two sections of differing visual obstruction.

In a further alternative embodiment, the control means further comprises a microprocessor operatively engaged to the motor and an input/output device operably engaged to the microprocessor. The control means may further have a sensor operably engaged to the input/output device wherein the sensor remotely located from the vision obstructing eyewear.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the present invention in the open position.

FIG. 3 is a side view of the present invention in the closed position.

FIG. 4 is a front perspective view of an alternative embodiment of the present invention.

FIG. 6 is a front view of an alternative embodiment of the vision restricting structure.

DESCRIPTION OF THE PREFERRED EMBODIMENT

With reference now to the drawings, and in particular to FIGS. 1-6 thereof, new vision obstructing eyewear embodying the principles and concepts of the present invention will be described.

Figure 1:
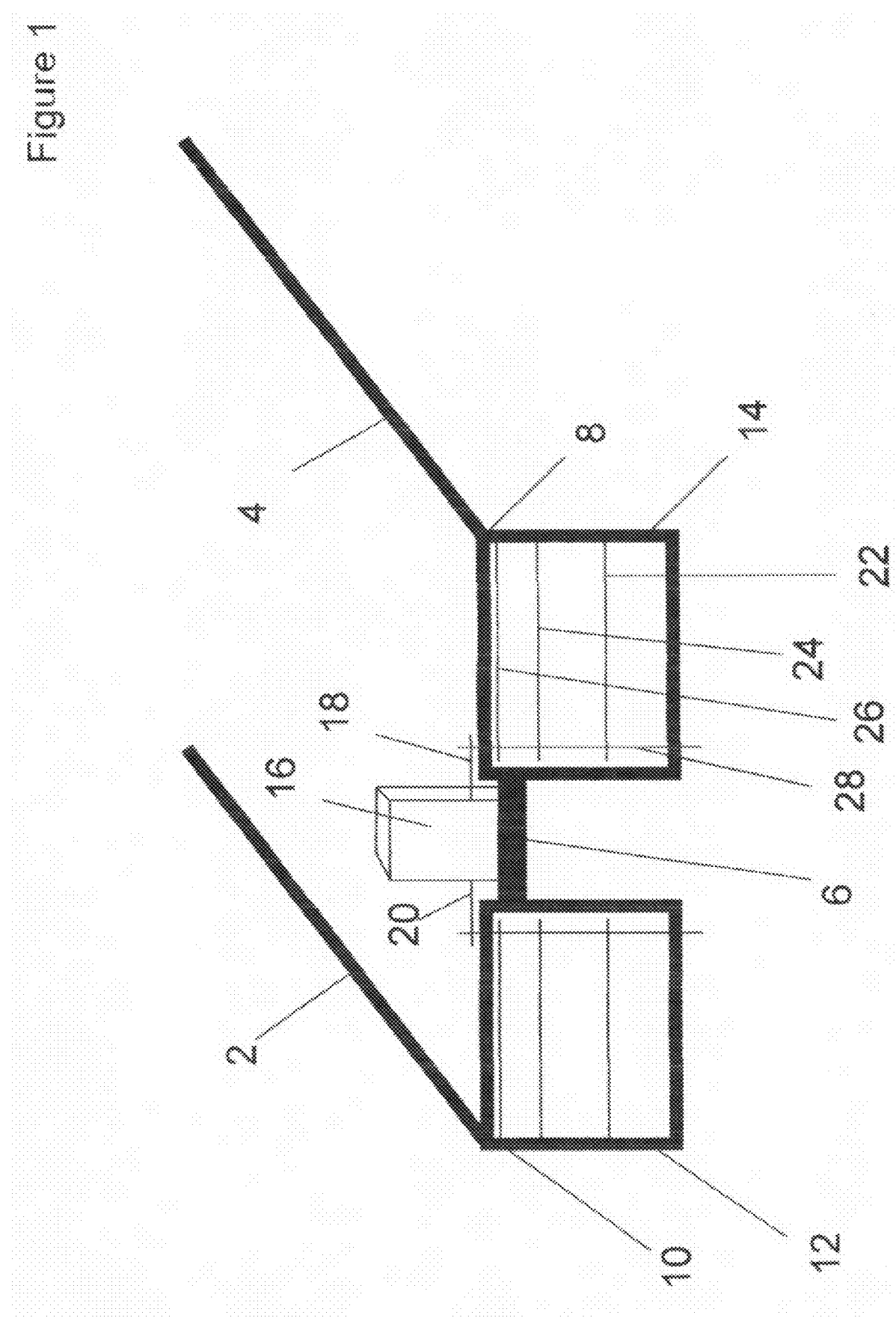
FIG. 1 is a front perspective view of the present invention.

Referring initially to FIG. 1, an embodiment of the vision obstructing eyewear 10 shall be described. The first embodiment of the vision obstructing eyewear has a typical prescription eyeglasses structure with earpieces 2, 4, lens frames 12, 14, and nose bridge 6. As is well known in the art, earpieces 2, 4 may be thin pieces of plastic or metal having a length approximately equal to the distance between a user's eye and the back of the user's ear. The earpieces 2, 4 are connected at one end to a lens frame 12, 14 and at the opposite end rest on the top of the ear. The lens frames 12, 14 are typically made from the same material as the earpieces 2, 4 and may be in a variety of shapes. The lens frames 12, 14 in FIG. 1 are in a common rectangular shape. The lens frames 12, 14 may be smaller, larger, or the same size as the user's eye. The lens frames 12, 14 are joined together via nose bridge 6. Nose bridge 6 is typically made from the same material as the earpieces 2, 4. Earpieces 2, 4, lens frames 12, 14, and nose bridge 6 make up the support structure of the vision obstructing eyewear. This support structure is similar for each of the eyeglasses support structure type embodiments of the present invention and because it is so well known, the details of the structure will not be discussed again when disclosing additional embodiments.

Using the eyeglasses support structure in FIG. 1, motor 16 may be mounted to nose bridge 6. The motor 16 can be electrically (e.g., a battery) or mechanically (e.g., a spring wound up by the user) powered. The motor is controlled by controller 15. Controller 15 may be as simple as a mechanical switch or as complex as a microprocessor with input/output structure (e.g., antenna or USB port). The motor is operatively engaged to gears, which in turn are operatively engaged to posts 18, 20. Referring now to FIG. 2, a side view of the vision obstructing eyewear is shown. Because the opposite side is a mirror-image, only one side will be discussed. Post 18 is operatively engaged to upper bar 30. Upper bar 30 is pivotally connected at either end to the proximal end of front bar 28 and the proximal end of rear bar 32. The distal end of front bar 28 and the distal end of rear bar 32 are pivotally connected to lower bar 34. The upper bar 30, front bar 28, rear bar 32, and lower bar 34 operate as a four bar mechanism and, in some embodiments, may be a parallelogram.

One or more shutters are operable connected to the front bar 28 and rear bar 32. In the present embodiment, three shutters are shown, but more or less shutters may be used. First shutter 22, second shutter 24, and third shutter 26 are planar and are pivotally attached to the front bar 28 and rear bar 32. Optionally, the opposing side of the shutter 22, 24, 26 may also be pivotally attached to the lens frame 14 to improve stability of the shutter.

In operation, when the user's vision is not to be obstructed the controller 15 will command the motor 16 to turn post 18 so that rear bar 32 moves in a downward direction and front bar 28 moves in an upward direction. As the rear bar 32 moves downward and the front bar 28 moves upward, shutters 22, 24, and 26 will pivot from a closed position (as shown in FIG. 3) to an open position (as shown in FIG. 2). Preferably, the shutters will stop at the point of least obstruction (i.e., at the point shutters 22, 24, and 26 are horizontal). The horizontal stopping point may be the result of a stop placed in the path of front bar 28 or it may be part of the controller 15 (i.e., part of the programming). When the user's vision is to be obstructed, the amount of obstruction will be determined by the distance the shutters 22, 24, and 26 are from horizontal. For the least obstruction, the shutters 22, 24, and 26 will be horizontal. For the greatest obstruction the shutters will be nearly vertical (as shown in FIG. 3).

In an alternative embodiment, the shutters 22, 24, and 26 can rotate in an upward direction beyond the horizontal (i.e., front bar 28 moves upward beyond the point at which the shutters are horizontal).

In operation, the controller 15 will command the motor 16 to turn post 18 so that rear bar 32 moves in an upward direction and front bar 28 moves in a downward direction. As the rear bar 32 moves upward and the front bar 28 moves downward, shutters 22, 24, and 26 will pivot from an open position (as shown in FIG. 2) to a closed position (as shown in FIG. 3).

As shown in FIG. 4, an alternative embodiment may have two motors 17, 19 attached to earpieces 2, 4, respectively. Shutters 22, 24, and 26 are moved by motor 19 and shutters 23, 25, and 27 are moved independently by motor 17. This allows the vision obstructing eyewear to obstruct each of the user's eyes at different levels of obstruction, thereby more closely approximating game conditions.

A further embodiment replaces the earpieces 2, 4 with an elastic band 85 connected at one end to lens frame 12 or earpiece 2 and the opposing end to lens frame 14 or earpiece 4. This embodiment may optionally have a flexible nose bridge 6 and/or lens frames so that when placed on the user's head, the vision obstructing eyewear molds to the shape of the user's face similar to swimming goggles. This elastic material will prevent the vision obstructing eyewear from slipping off in use.

Figure 5:
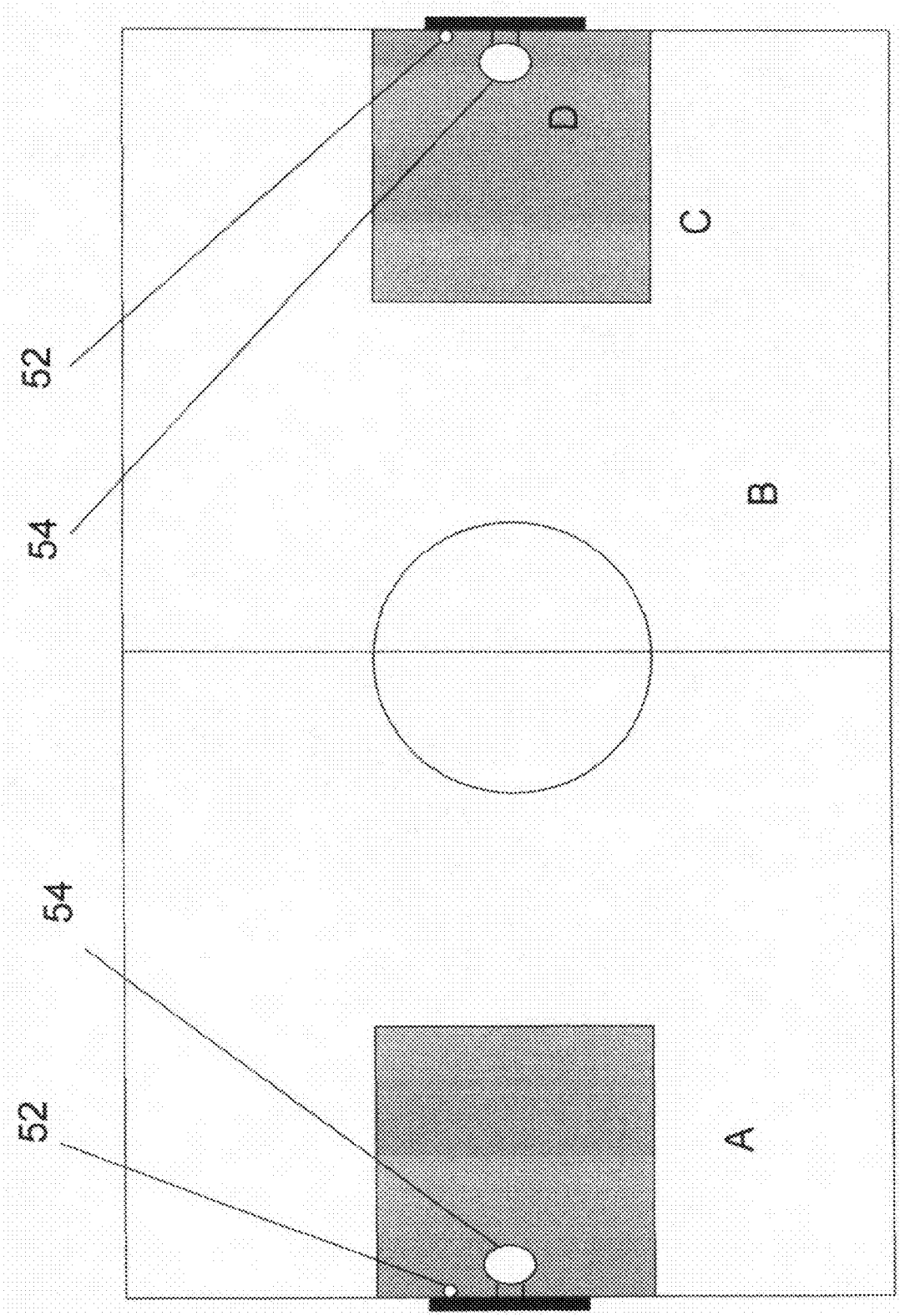
FIG. 5 is a top view of a basketball court to aid in describing how the present invention may operate.

An even further embodiment uses an active controller. The communication and sensor circuitry for an active controller is well known in the art and is discussed in at least U.S. Pat. No. 6,311,982. The active controller senses the user's location on, for example, a basketball court. Because vision is rarely obstructed when bringing the ball up the court, the controller would keep the shutters in the open position in the backcourt. Referring to FIG. 5, a user in position A would not have any obstruction in vision. When the user reaches position B, the vision obstructing eyewear may, for example, have 20% obstruction (i.e., 20% of the field of vision is obstructed). As the user moves closer to the net 50, the obstruction level would increase. For example, at position C, the obstruction level could be 40% and at position D, 80%.

In a preferred embodiment having an active controller, a sensor 52 is attached to the basketball net 50. The sensor is operatively engaged to the controller 16 (or 17, 19). As the sensor senses the user's movement on the court, the sensor communicates with the controller and the controller adjusts the obstruction level accordingly.

In another embodiment, the obstruction level would follow a pre-programmed plan. The program would be installed in the microprocessor of the controller and would carry out a series of steps to vary the obstruction level. The controller could also be programmed to vary the obstruction levels randomly.

FIG. 6 illustrates a further embodiment of the present invention. In this embodiment, transparent or semi-transparent disks 60, 62 are used rather than shutters 22, 24, and 26 to restrict the user's vision. The disks 60, 62 may have, for example, a plurality of vision restricting sections 64, 66, 68, 70, 72, 74, 76, and 78. For example, section 74 has slots cut through the disk and section 76 has circular holes drilled through the disk. These slots and holes allow the user a certain level of obstructed vision when rotated into position in front of the lens frames 12, 14. The density and size of the holes and slots can be whatever is desired and will control the level of obstruction. The obstruction sections may also be randomly arranged slots and/or holes as in section 64 or may be colored or stressed translucent material to obstruct vision. Section 66 has a graduated colored oval section to obstruct vision, but it could be in any pattern. The obstruction sections could even be stripes of color or different thicknesses of translucent material. Each disk 60, 62 will also have an unobstructed section 70, 72 so that the user will have full vision sometimes while wearing the eyewear.

The disks 60, 62 are mounted on posts 80, 82, which are operatively engaged to motors 17, 19, respectively. Motors 17, 19 are mounted to the lens frames 12, 14 or earpieces 2, 4, respectively. The disks 60, 62 can rotate in either direction depending on the direction the motors 17, 19 turn the posts 80, 82.

In operation, the user would typically start off with sections 70, 72 in front of the lens frame. This would allow the user to have unobstructed vision. The motor 17 could then rotate in a clockwise direction to place section 74 in front of lens frame 12 and, optionally, motor 19 could rotate counter-clockwise to place section 64 in front of lens frame 14. The disks 60, 62 could move to each section and back again countless times. Either disk 60, 62 could be rotated in either direction according to a predetermined program or randomly—whatever best simulates actual game conditions.

In a preferred embodiment, the obstruction level is constantly varied to simulate real game conditions. For example, a basketball player on defense would not keep a hand over an offensive player's eyes for more than a few seconds and more typically the defensive player would be waving both hands in the offensive player's field of vision. Therefore, a continuously changing obstruction pattern would best simulate actual play. In a further preferred embodiment, the average obstruction level would increase when the user was in locations on the court in which an offensive player's vision would be obstructed at a higher level by a defensive player (i.e., the average obstruction level would be higher at position D than at position B, despite the obstruction level constantly changing).

While the present embodiments have been shown with three shutters, the number of shutters may be any number. Further, the orientation of the shutters is not limited to what is illustrated and the shutters may have any orientation when accompanied by any necessary rotation of the motor and bars.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. Vision obstructing eyewear comprising:
   a. mounting means for removably securing the eyewear to a user's head; the mounting means comprising: a first earpiece having first and second ends, the first earpiece being of a length to span the distance from a user's eye to a user's ear, the first end of the first earpiece being connected to a first lens frame; a second earpiece having first and second ends, the second earpiece being of a length to span the distance from a user's eye to a user's ear, the first end of the second earpiece being connected to a second lens frame; and a nose bridge having first and second ends, the first end being connected to the first lens frame and the second end being connected to the second lens frame; the first lens frame being connected to the mounting means; the second lens frame being connected to the mounting means;
   b. a vision obstruction disk mounted on a post rotatably connected to a motor; the vision obstruction disk having a plurality of sections, at least one of said sections is directly in front of one of the first or second lens frame; and
   c. a control means for selecting a section of the vision obstruction disk to be in front of the first or second lens frame; the control means proximately attached to the mounting means; the control means comprising a power source; one or more motors electrically connected to a battery; and one or more movable posts rotatably connected to the one or more motors, a microprocessor electrically connected to and in communication with the one or more motor; an input/output device electrically connected to the microprocessor, wherein the input/output device is operably engaged with a sensor being remotely located from the vision obstructing eyewear.

2. Vision obstructing eyewear comprising:
   a. mounting means for removably securing the eyewear to a user's head; the mounting means comprising: a first earpiece having first and second ends, the first earpiece being of a length to span the distance from a user's eye to a user's ear, the first end of the first earpiece being connected to a first lens frame; a second earpiece having first and second ends, the second earpiece being of a length to span the distance from a user's eye to a user's ear, the first end of the second earpiece being connected to a second lens frame; and a nose bridge having first and second ends, the first end being connected to the first lens frame and the second end being connected to the second lens frame; the first lens frame being connected to the mounting means; the second lens frame being connected to the mounting means;
   b. vision obstruction means comprising: an upper bar having an upper end and a lower end, the upper bar being attached to the one or more movable posts at a position along the upper bar's length; a front bar having an upper end and a lower end, the upper end of the front bar being pivotally attached to the upper end of the upper bar; a rear bar having an upper end and a lower end, the upper end of the rear bar being pivotally attached to the lower end of the upper bar, a lower bar having an upper end and a lower end, the upper end of the lower bar being pivotally attached to the lower end of the rear bar and the lower end of the rear bar being pivotally attached to the lower end of the front bar; and one or more shutters operatively attached at one or more first points along the front bar and one or more second points along the rear bar; and c. a control means for selecting a degree of obstruction provided by the vision obstruction means; the control means proximately attached to the mounting means; the control means comprising a power source; one or more motors electrically connected to a battery; and one or more movable posts rotatably connected to the one or more motors, a microprocessor electrically connected to and in communication with the one or more motor; an input/output device electrically connected to the microprocessor, wherein the input/output device is operably engaged with a sensor being remotely located from the vision obstructing eyewear.

* * * * *